(12) United States Patent
Wang et al.

(10) Patent No.: US 12,465,558 B2
(45) Date of Patent: Nov. 11, 2025

(54) CURABLE ORAL CARE COMPOSITION CONTAINING SILVER AND FLUORIDE

(71) Applicant: Solventum Intellectual Properties Company, Maplewood, MN (US)

(72) Inventors: Yizhong Wang, Woodbury, MN (US); Richard P. Rusin, Woodbury, MN (US); Jie J. Liu, Cottage Grove, MN (US); Tiffany T. Ton, Woodbury, MN (US); Carola A. Carrera Vidal, Plymouth, MN (US); Joel D. Oxman, Minneapolis, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 609 days.

(21) Appl. No.: 17/789,379

(22) PCT Filed: Dec. 29, 2020

(86) PCT No.: PCT/IB2020/062514
§ 371 (c)(1),
(2) Date: Jun. 27, 2022

(87) PCT Pub. No.: WO2021/137152
PCT Pub. Date: Jul. 8, 2021

(65) Prior Publication Data
US 2023/0074073 A1    Mar. 9, 2023

Related U.S. Application Data

(60) Provisional application No. 62/968,115, filed on Jan. 30, 2020, provisional application No. 62/956,008, filed on Dec. 31, 2019.

(51) Int. Cl.
*A61K 6/20* (2020.01)
*A61K 6/70* (2020.01)
*A61K 6/887* (2020.01)

(52) U.S. Cl.
CPC ............. *A61K 6/20* (2020.01); *A61K 6/70* (2020.01); *A61K 6/887* (2020.01)

(58) Field of Classification Search
None
See application file for complete search history.

(56) References Cited

U.S. PATENT DOCUMENTS

| 2,981,640 | A  | 4/1961  | Hill |
| 3,567,823 | A  | 3/1971  | Yamaga et al. |
| 3,655,605 | A  | 4/1972  | Smith |
| 3,814,717 | A  | 6/1974  | Wilson et al. |
| 4,143,018 | A  | 3/1979  | Crisp et al. |
| 4,360,605 | A  | 11/1982 | Schmitt et al. |
| 4,376,835 | A  | 3/1983  | Schmitt et al. |
| 4,439,380 | A  | 3/1984  | Michl et al. |
| 4,515,910 | A  | 5/1985  | Rawls et al. |
| 5,063,257 | A  | 11/1991 | Akahane et al. |
| 6,293,287 | B1 | 9/2001  | Anglin et al. |
| 6,461,161 | B1 | 10/2002 | Ngo et al. |
| 6,573,312 | B2 | 6/2003  | Han et al. |
| 6,923,990 | B2 | 8/2005  | Capelli |
| 7,090,722 | B2 | 8/2006  | Budd et al. |
| 8,968,709 | B2 | 3/2015  | Yang et al. |
| 2005/0117112 | A1 | 6/2005  | Nayiby et al. |
| 2010/0247456 | A1 | 9/2010  | Niederman et al. |

FOREIGN PATENT DOCUMENTS

| EP | 0694298 B1 | 6/2010 |
| WO | 2018092889 A1 | 5/2018 |
| WO | 2019069564 A1 | 4/2019 |
| WO | 2020021494 A1 | 1/2020 |
| WO | 2020021495 A1 | 1/2020 |

OTHER PUBLICATIONS

CN106957266A Machine Translation (Year: 2017).*
WO2018092889A1 Machine Translation (Year: 2018).*
International Search Report for PCT International Application No. PCT/IB2020/062514, mailed on Mar. 22, 2021, 5 pages.
Koizumi, "Effect of a Silver Diamine Fluoride and Potassium Iodide-Based Desensitizing and Cavity Cleaning Agent on Bond Strength to Dentine", International Journal of Adhesion & Adhesives, 2016, vol. 68, pp. 54-61.

* cited by examiner

*Primary Examiner* — Robert A Wax
*Assistant Examiner* — Quanglong N Truong

(57) ABSTRACT

A dental composition including a silver-fluoride composition and a curable resin composition is described. Also described are methods for repairing a tooth surface employing the dental composition, and kits re same.

20 Claims, No Drawings

CURABLE ORAL CARE COMPOSITION CONTAINING SILVER AND FLUORIDE

CROSS REFERENCE TO RELATED APPLICATIONS

This application is a national stage filing under 35 U.S.C. 371 of PCT/IB2020/062514, filed Dec. 29, 2020, which claims the benefit of Provisional Application No. 62/956,008, filed Dec. 31, 2019 and Provisional Application No. 62/968,115, filed Jan. 30, 2020, the disclosure of which is incorporated by reference in its/their entirety herein.

BACKGROUND

Dental caries is a disease in which tooth decay results from interaction with acid produced by bacteria. Silver salts are known to have antibacterial properties and fluoride salts are known to remineralize tooth surfaces. Both silver and fluoride compositions have separately been shown to aid in preventing and arresting caries activities.

Silver diamine fluoride has been used to treat surfaces affected by caries; however, reaction with saliva causes the formation of silver phosphate. Silver phosphate is light sensitive and permanently stains teeth black when exposed to light. Silver fluoride (without a diamine stabilizer) is extremely unstable in aqueous solutions and quickly decomposes to form metallic silver.

It was has recently demonstrated in Int. Pat. App. No. IB2019/056376, the contents of which are incorporated herein by reference upon publication, that a stable form of aqueous silver cations and fluoride anions is achievable for treating caries or preventing caries progression. While promising, repeated application of the solution is often required.

What is needed is a way to treat a tooth surface with silver and fluoride without requiring an arduous treatment plan and mitigating fluoride ingestion. The present disclosure describes a dental composition for restoring a tooth surface that is capable of releasing silver cations and fluoride anions over time to prevent further decay.

SUMMARY

In one embodiment, a dental composition is described. The dental composition may include a silver-fluoride composition including a source of silver cations, a source of fluoride anions, a source of iodide or thiocyanate anions, and water. The dental composition may include a curable resin composition including at least one (meth)acrylate monomer.

In one embodiment, a kit is described. The kit may include a dental composition including 1) a silver-fluoride composition including a source of silver cations, a source of fluoride anions, a source of iodide or thiocyanate anions, and water; and 2) a curable resin composition including at least one (meth)acrylate monomer. The kit may further include a set of instructions directing a user to contact the dental composition to a tooth surface and apply light at a wavelength from about 250 nm to about 700 nm to the dental composition on the tooth surface.

In one embodiment, a method for repairing a tooth surface is described. The method may include providing a dental composition including 1) a silver-fluoride composition including a source of silver cations, a source of fluoride anions, a source of iodide or thiocyanate anions, and water; and 2) a curable resin composition including at least one (meth)acrylate monomer. The method may further include contacting the dental composition to the tooth surface and applying a light at a wavelength from about 250 nm to about 700 nm to the dental composition on the tooth surface.

DETAILED DESCRIPTION

As used herein, "about" means ±10 percent of a given value. For example, about 10 means 9 to 11.

As used herein, "alkyl" means a linear or branched hydrocarbon chain. The hydrocarbon chain is saturated unless indicated otherwise. For example, a $C_{1-6}$ alkyl means a $C_1$ alkyl (i.e., methyl), a $C_2$ alkyl (i.e., ethyl), $C_3$ alkyl (i.e., propyl, isopropyl), $C_4$ alkyl (e.g., butyl, isobutyl, secbutyl), $C_5$ alkyl (e.g., pentyl), or $C_6$ (e.g., hexyl).

As used herein, "alkylenyl" refers to a bivalent alkyl group, i.e., -R-, where R includes $((CH_2)n$ and n may be defined by "$C_{X-Y}$" or "$C_X$-$C_Y$" where x and y are integers which indicate the number of carbon atoms. In some embodiments, alkylenyl groups may be optionally substituted, i.e., wherein one or more hydrogen is replaced with a defined group, e.g., —OH, $C_{1-4}$ alkyl, or the like.

As used herein, "aryl" describes a heteroatom-free aromatic moiety. An aromatic compound is cyclic, planar, fully conjugated, and follows thickles Rule (i.e., having 4n+2π-electrons, wherein n is an integer). For example, phenyl is a $C_6$ aryl, naphthyl and azulenyi are $C_{10}$ aryls, and anthracenyl and phenanthrenyl are $C_{14}$ aryls. An aryl group may be unsubstituted, or substituted with groups such as $C_{1-6}$ alkyl optionally substituted with one or more halogens (e.g., —$CF_3$), $C_{1-6}$ alkoxy (e.g., —$OCH_3$, —$OCH_2CH_3$, or the like) optionally substituted with one or more halogens (e.g., —$OCF_3$) halogens (e.g., I, Br, Cl, F), or the like.

As used herein, "arylene" describes a bivalent aryl group, e.g., -R- where R is any aryl group described herein.

As used herein, "cycloalkylenyl" refers to a bivalent cycloalkyl group, e.g., cyclopropyl, cyclobutyl, cyclopentyl, cyclohexyl, or the like. Cycloalkylenyl is meant to include bicyclic and fused cycloalkyl groups where appropriate, e.g., isobornyl. The size of the any such cycloalkyl group is defined by "$C_{X-Y}$" or "$C_X$-$C_Y$" where x and y are integers which indicate the number of carbon atoms.

As used herein, "glass ionomer" refers to compositions that include a homopolymer or copolymer of an α,β unsaturated carboxylic acid, e.g., (meth)acrylate monomers described herein, and acid-substituted (meth)acrylate monomers described herein), a reactive glass filler such as fluoroaluminosilicate (FAS) and fluoroaluminoborate glass, and water. The homopolymer or copolymer may be referred to herein as a polycarboxylic acid or a polyacid.

As used herein, "(meth)acrylate" refers to a methacrylate compound or an acrylate compound, e.g., C(R)(R)=C(R)C(O)O-R, wherein each R is as described herein.

As used herein, the phrase "one or more of" such as used in the phrase "one or more of A and B" or "one or more of at least one A and at least one B" means a composition may include at least one A, more than one A, at least one B, more than one B, at least one A and at least one B, more than one A and more than one B. In other words, the phrase is not intended to mean the composition must have at least one of each of A and B.

As used herein, "optionally substituted" described a group that may or may not be substituted with a given substituent. The substitution reflects the exchange of a hydrogen for the given substituent. For example, an alkyl group, e.g., —$CH_2CH_2CH_3$ may or may not be (i.e., optionally) substituted with a hydroxyl group, e.g., —$CH(OH)CH_2CH_3$, —$CH_2CH(OH)CH_3$, —$CH_2CH_2CH_2OH$, or the like. The site of optional substitution is anywhere that includes an available hydrogen to be exchanged that would result in a stable compound.

As used herein, "polycarboxylic acid" or "polyacid" refer to a homopolymer or copolymer derived from monomers having an acidic moiety. For example, the homopolymers or copolymers derived from any combination of the (meth) acrylate or acid-substituted (meth)acrylate monomers would be considered a polycarboxylic acid or polyacid.

As used herein, "reactive glass" refers to an ion-leachable glass that is capable of reacting with the polycarboxylic acid in the presence of water to form a hydrogel.

As used herein, "resin-modified glass ionomer" refers to compositions that include a homopolymer or copolymer of an $\alpha$, $\beta$ unsaturated carboxylic acid, e.g., (meth)acrylate monomers described herein and acid-substituted (meth) acrylate monomers described herein. The homopolymer or copolymer may be referred to herein as a polycarboxylic acid or a polyacid. A resin-modified glass ionomer further includes (meth)acrylate monomer(s) described herein, a reactive glass filler such as fluoroaluminosilicate glass (FAS) and fluoroaluminoborate glass, and water. The polycarboxylic acid may optionally be modified to replace or end-cap some of the acidic moieties with pendant (meth) acrylate groups.

Dental Compositions

In many embodiments, a dental composition is described. The dental composition may include a silver-fluoride composition including a source of silver cations, a source of fluoride anions, a source of iodide or thiocyanate anions, and water. The dental composition may include a curable resin composition comprising at least one (meth)acrylate monomer.

In some embodiments, the dental composition may further include a photoinitiator.

In some embodiments, the curable resin composition may further include a photoinitiator.

In some embodiments, the dental composition may further include at least one acid-substituted (meth)acrylate monomer.

In some embodiments, the curable resin composition may further include at least one acid-substituted (meth)acrylate monomer.

In some embodiments, the dental composition may further include homopolymers or copolymers of any (meth) acrylate or acid-substituted (meth)acrylate monomers described herein.

In some embodiments, the curable resin composition may further include homopolymers or copolymers of any (meth) acrylate or acid-substituted (meth)acrylate monomers described herein, i.e., monomers of Formulae (Ia), (IIa), (IIIa), (Ib), (IIb), (IIIb), (Ic), (IIc), (IIIc), or a combination thereof.

In some embodiments, the dental composition may further include a polyacid.

In some embodiments, the curable resin composition may further include a polyacid.

In many embodiments, the dental composition is capable of releasing silver cations and fluoride anions after the dental composition has been cured or hardened. Leeching of silver cations and fluoride anions to a tooth surface may help arrest caries and remineralize tooth structures.

In some embodiments, the dental composition may include silver cations present in an amount of about 13-20 wt % with respect to the weight of the silver-fluoride composition. For example, the silver cations may be present in an amount in wt % with respect to the weight of the silver-fluoride composition of about 13.0, 13.25, 13.5, 13.75, 14.0, 14.25, 14.5, 14.75, 15.0, 15.25, 15.5, 15.75, 16.0, 16.25, 16.5, 16.75, or 17.0, 17.5, 18.0, 18.5, 19.0, 19.5, or 20.0, or a value within a range between any of the preceding values, for example, between about 13.5 and about 15.0, between about 14.0 and about 16.75, or the like. The source of silver anions may be any source described herein.

In some embodiments, the silver-fluoride composition may include silver cations and iodide anions present in a molar ratio of less than about 0.42:1 respectively. For example, silver cations may be present in a molar ratio relative to iodide anions of about 0.42:1, 0.40:1, 0.38:1, 0.36:1, 0.34:1, 0.32:1, 0.30:1, 0.28:1, 0.26:1, 0.24:1, 0.22:1, 0.20:1, 0.18:1, 0.16:1, 0.14:1, 0.12:1, or 0.10:1, or a value within a range between any of the preceding values, for example, between about 0.35:1 and about 0.40:1, between about 0.22:1 and about 0.32:1, or the like. In some embodiments, the silver cations and iodide anions may be present in a molar ratio of less than about 0.10:1. The source of iodide anions may be any source described herein.

In some embodiments, the silver-fluoride composition may include silver cations and thiocyanate anions present in a molar ratio of less than about 0.37:1. In some embodiments, the silver-fluoride composition may include silver cations and thiocyanate anions present in a molar ratio of between about 0.1:1 and about 0.37:1. For example, silver cations may be present in a molar ratio relative to thiocyanate anions of about 0.1:1, 0.15:1, 0.2:1, 0.25:1, 0.30:1, 0.35:1 or 0.37:1, or a value within a range between any of the preceding values, for example, between about 0.15:1 to about 0.25:1, between about 0.1:1 and about 0.2:1, or the like. The source of thiocyanate anions may be any source described herein.

In some embodiments, the dental composition may include fluoride anions present in an amount of about 2.25-4.0 wt % with respect to the weight of the silver-fluoride composition. For example, the silver cations may be present in an amount in wt % with respect to the weight of the silver-fluoride composition of about 2.25, 2.30, 2.35, 2.40, 2.45, 2.50, 2.55, 2.60, 2.65, 2.70, 2.75, 2.80, 2.85, 2.90, 3.0, 3.1, 3.2, 3.3, 3.4, 3.5, 3.6, 3.7, 3.8, 3.9, or 4.0, or a value within a range between any of the preceding values, for example, between about 2.50 and about 2.70, between about 2.35 and about 2.85, or the like. The source of fluoride anions may be any source described herein.

In some embodiments, the dental composition may include water present in an amount less than about 45 wt % with respect to the weight of the silver-fluoride composition. For example, water may be present in an amount in wt % with respect to the weight of the silver-fluoride composition of about 45, 44, 43, 42, 41, 40, 35, 30, 25, 20, 15, and 10, or a value within a range between any of the preceding values, for example, between about 40 and about 44, between about 30 and about 35, or the like.

In some embodiments, the dental composition may include water present in an amount of at least 20 wt-%, based on the total weight of the solution.

In some embodiments, the dental composition includes a silver-fluoride composition having iodide anions and includes water present in an amount less than 41.2 wt-% with respect to the weight of the silver-fluoride composition.

In some embodiments, the dental composition includes a silver-fluoride composition having thiocyanate anions and includes water present in an amount less than 57.1 wt-% with respect to the weight of the silver-fluoride composition.

In some embodiments, the silver-fluoride composition may be present in an amount in wt % with respect to the weight of the dental composition of about 5 wt % to about 55 wt %. For example, the silver-fluoride composition may be present in an amount in wt % with respect to the weight of the dental composition of about 5, 10, 15, 20, 25, 30, 35, 40, 45, 50, or 55, or a value within a range between any of the preceding values, for example, between about 25 and about 35, between about 20 and about 45, or the like.

In some embodiments, the one or more (meth)acrylate monomer may be present in an amount in wt % with respect to the weight of the dental composition of about 45 wt % to about 95 wt %. For example, the one or more (meth)acrylate monomer may be present in an amount in wt % with respect to the weight of the dental composition of about 45, 50, 55, 60 65, 70, 75, 80. 85, 90, or 95, or a value within a range between any of the preceding values, for example, between about 55 and about 65, between about 40 and about 50, or the like.

In some embodiments, the photoinitiator is present in an amount in wt % with respect to the weight of the dental composition of about less than 1 wt %.

In some embodiments, the dental composition may further include a resin-modified glass ionomer (RMGI), a glass ionomer (GI), or a combination thereof. Generally, GI and RMGI materials are either self-cured and/or light cured bioactive dental restorative materials that form a polymerized resin matrix that bonds to a tooth. A resin-modified glass ionomer may include (meth)acrylate monomers, such as those described herein, including those having one or more pendant acid groups, i.e., an acid-substituted (meth)acrylate monomer.

In some embodiments, the dental composition may further include one or more active agents that protect the oral cavity against disorders, diseases, or conditions of the teeth, gums, cheeks, tongue, roof of the mouth, and the like. Examples of active agents that can be employed include one or more other fluorine-containing compounds, such as sodium monofluorophosphate, stannous fluoride, calcium fluoride, strontium fluoride, zinc fluoride, zinc potassium fluoride, ammonium fluoride, potassium magnesium fluoride, and combinations thereof. Examples of additional active agents that can be employed include one or more whitening agents, anticalculus agents, remineralization agents, stannous sources, antimicrobial agents, antioxidants, saliva stimulating agents, breath freshening agents, antiplaque agents, anti-inflammatory agents, $H_2$ antagonists, desensitizing agents, nutrients, proteins, and combinations thereof.

In some embodiments, the dental composition may further include a whitening agent. Example whitening agents include a peroxide whitening agent, a non-peroxide whitening agent, or both. Peroxide whitening agents include hydrogen peroxide, peroxide of alkali or alkaline earth metals, such as sodium peroxide, potassium peroxide, lithium peroxide, magnesium peroxide, calcium peroxide, barium peroxide, and the like, glyceryl hydrogen peroxide, alkyl hydrogen peroxide, dialkyl peroxide, peroxy acids or peroxy acid salts, benxoyl peroxide, urea peroxide, and the like. Hydrogen peroxide is most common. Non-peroxide whitening agents include chlorine dioxide, chlorites, and hypochlorites. Chlorites and hyperchlorites are typically in the form of alkali or alkaline earth metal salts, such as salts of lithium, potassium, sodium, magnesium, calcium, or barium. Colorants, titanium dioxide, and hydroxyapatite can also be used.

In some embodiments, the dental composition may further include an anticalculus agents can be a wide variety of suitable anticalculus agents. The anticalculus agents can include, for example, phosphates, polyphosphates, such as pyrophosphates, polyolefin sulfonates, polyolefin phosphates, diphosphonates, phosphonoalkane carboxylic acids, and salts thereof, typically alkali metal or ammonium salts.

In some embodiments, the dental composition may further include a remineralization agent. Example remineralization agents include materials that release calcium ions, phosphorous-containing ions, or both, such as calcium phosphate (e.g., mono-, di-, and/or tricalcium phosphate), hydroxyapatite, calcium carbonate, and the like. Examples of materials that release calcium ions are calcium salts that are water soluble, such as those selected from calcium chloride, calcium nitrate, calcium gluconate, calcium lactate gluconate, calcium acetate, hydrates thereof, and combinations thereof. In certain embodiments, a remineralization anent may be selected from calcium chloride, calcium nitrate, hydrates thereof, and combinations thereof.

In some embodiments, a calcium remineralizing salt described herein can also be used to modulate the fluoride release profile.

In some embodiments, the dental composition may further include stannous ions. Sources of stannous ions include, for example, stannous halides, organic stannous carboxylate salts, such as stannous formate, stannous acetate, stannous gluconate, stannous lactate, stannous tartrate, and stannous citrate. When the fluoride source is stannous fluoride, it can also function as a stannous source.

In some embodiments, the dental composition may further include an antimicrobial agent. Examples include triclosan, 8-hydroxyquinoline, zinc ion, stannous ion, cupric compounds, phthalic acid and salts thereof, quaternary ammonium compounds, sanguinarine, salicylanilide, salicylic acid, thymol, eugenol, neomycin, kanamycin, clindamycin, amoxicillin, tetracycline, doxycycline, minocycline, metronidazole, chlorohexidine, and the like.

In some embodiments, the dental composition may further include an antioxidant. Examples include butylated hydroxy anisone, butylated hydroxy toluene, vitamin A, carotenoids, vitamin E, flavonoids, polyphenols, ascorbic acid or salts thereof, chlorophyll, melatonin, and the like.

In some embodiments, the dental composition may further include a saliva stimulant. Examples include citric acid, lactic acid, succinic acid, ascorbic acid, adipic acid, fumaric acid, and tartaric acid.

In some embodiments, the dental composition may further include a breath freshening agent. Examples include zinc salts such as zinc salts of gluconate, citrate, and chlorite, alpha-ionone, and the like.

In some embodiments, the dental composition may further include an antiplaque agent. Examples include stannous salts, salts of copper, magnesium or strontium, dimethicone copolyols, such as cetyl dimethicone copolyol, papain, glucamylase, glucose oxidase, urea, calcium lactate, calcium glycerophosphate, strontium polyacrylates, and the like. Further examples of antiplaque agents include biofilm inhibition agents, particularly those described in U.S. Pat. No. 8,968,709 (Yang et al.).

In some embodiments, the dental composition may further include an anti-inflammatory agent. Examples include steroids such as flucinolone and hydrocortisone, non-steroidal anti-inflammatory drugs such as ketorolac, flurbiprofen, ibuprofen, naproxen, indomethacin, diclofenac, etodolac, indomethacin, sulindac, tomlmetin, ketoprofen, fenoprofen, piroxicam, nabumetone, acetyl salicylic acid, salicylic acid, diflunisal, meclofenamate, mefenamic aicd, oxyphenbutazone, phenylbutazone, and the like.

In some embodiments, the dental composition may further include an $H_2$ antagonist. Examples include cimetidine, etinidine, ranitidine, tiotidine, lupitidine, denetidine, famotidine, roxatidine, pifatidine, lamtidine, zaltidine, nizatidine, mifentidine, ramixotidine, loxtidine, bisfentidine, sufotidine, ebrotidine, impromdine, and the like.

In some embodiments, the dental composition may further include a desensitizing agent. Examples include potassium citrate, potassium chloride, potassium tartrate, potassium bicarbonate, potassium oxalate, potassium nitrate, strontium salts, arginine, acetyl salicylic acid or salts thereof, salicylic acid or salts thereof, codeine, acetaminophen, and the like.

In some embodiments, the dental composition may further include nutrients. Examples include vitamins, such as vitamins C, D, thiamine, riboflavin, folic acid, nicotinamide, niacin, pyridoxine, bioflavonoids, and the like, supplements, such as amino acids, lipotropics, fish oil, polyunsaturated fatty acids, eicosapentanoic acid, docosahexanic acid, coenzyme Q10, ubiquinone, minerals such as potassium, and the like.

In some embodiments, the dental composition may further include proteins. Examples include milk proteins, peroxide producing enzymes, amylase, papain, glucoamylase, glucose oxidase, and the like.

In many embodiments, the dental composition is free of organic solvents that function as liquid carriers (as opposed to organic solvents that are used as carriers/solvents for flavorants or sweeteners). For example, certain additives may be provided as a solution or dispersion in an organic solvent as a liquid carrier. If there is any organic solvent (that functions as a liquid carrier) present in aqueous oral care solutions of the present disclosure, it is present in an amount of less than 5 wt % with respect to the weight of the dental composition In many embodiments, the dental composition does not stain teeth. This can be determined by combining an dental composition in a ratio of 3:1 with a 1% phosphate solution and exposing it to a blue LED light with wavelength around 430-480 nm and output of approximately 1500 mW/cm2 (−10%/+20%), such as that commercially available under the Tradename 3M ELIPAR DEEPCURE-S LED curing light (available from 3M Company, St. Paul, MN) for 20 seconds to see whether the mixture turned into black precipitation.

In many embodiments, the dental composition is shelf stable for at least 1 year without precipitation (detectable to the human eye) particularly when in a sealed container. Thus, aqueous oral care solutions of the present disclosure are clear (i.e., transparent or translucent) for at least 1 year until contacted with additional water or saliva.

Source of Silver Cations

In some embodiments, the source of silver cations may be selected from one or more of silver fluoride, silver chloride, silver nitrate, silver iodide, and silver diamine fluoride.

In some embodiments, the source of silver cations may be selected from one or more of silver fluoride, silver chloride, silver nitrate, and silver iodide.

In some embodiments, the source of silver cations is silver iodide.

Source of Fluoride Anions

In some embodiments, the source of fluoride anions is selected from one or more of silver fluoride, silver diamine fluoride, sodium fluoride, ammonium fluoride, potassium fluoride, and an organic ammonium fluoride.

As used herein, "organic ammonium fluoride" describes a compound of the the formula $R_4N^+F^-$, wherein at least one R is a $C_4$-$C_{26}$ hydrocarbon. Example organic ammonium fluorides include 3-[octadecyl(2-hydroxyethyl)aminopropyl]bis(2-hydroxyethypamine dihydrofluoride (OLAFLUR), $CH_3(CH_2)_7CH=CH(CH_2)_8^+F^-$ (DECTAFLUR), tetrabutyl ammonium fluoride, or the like.

In some embodiments, the source of fluoride anions is selected from one or more of silver fluoride, sodium fluoride, ammonium fluoride, potassium fluoride, and an organic ammonium fluoride.

In some embodiments, the source of fluoride anions is selected from one or more of silver fluoride, silver diamine fluoride, ammonium fluoride, potassium fluoride, and an organic ammonium fluoride.

In some embodiments, the source of fluoride anions is selected from one or more of silver fluoride, ammonium fluoride, potassium fluoride, and an organic ammonium fluoride.

In some embodiments, the source of fluoride anions is ammonium fluoride.

Source of Iodide Anions

In some embodiments, the source of iodide anions is selected from one or more of ammonium iodide, sodium iodide, potassium iodide, and silver iodide.

In some embodiments, the source of iodide anions is selected from one or more of ammonium iodide, sodium iodide, and potassium iodide.

In some embodiments, the source of iodide anions is ammonium iodide and silver iodide.

In some embodiments, the source of iodide anions is ammonium iodide.

Source of Thiocyanate Anions

In some embodiments, the source of thiocyanate anions is selected from one or more of ammonium thiocyanate, sodium thiocyanate, guanidinium thiocyanate, potassium thiocyanate, and silver thiocyanate.

In some embodiments, the source of thiocyanate anions is ammonium thiocyanate.

Curable Resin Composition

In many embodiments, the curable resin composition may include one or more (meth)acrylate monomers. In some embodiments, the curable resin composition may include 1-10 (meth)acrylate monomers, i.e., 1, 2, 3, 4, 5, 6, 7, 8, 9, or 10 (meth)acrylate monomers. In some embodiments, the curable resin composition may include 1-5 (meth)acrylate monomers.

In some embodiments, the one or more (meth)acrylate monomer may include any known acrylate, diacrylate, or triacrylate monomers known in the dental field. Various linking groups are known, including aliphatic, cycloaliphatic, aromatic (aryl and aralkyl), polyethylene glycol, polypropylene glycol, urethanyl, and combinations thereof. Various acidic functionalities and are known to assist in adhering restorations to tooth surfaces, such as carboxylic acids, phosphates, and the like. Methods for producing any (meth)acrylate monomers having any combination of the above features are understood by those skilled in the art.

In some embodiments, the one or more (meth)acrylate monomer may be selected from the following formulae:

$$H_2C=CH(R^1)—C(O)—OR^2 (Ia), H_2C=CH(R^1)—C(O)-R^3—C(O)—CH(R^1)=CH_2(IIa), and$$
$$H_2C=CH(R^1)-CO)-R^3—C(O)-R^4(IIIa),$$

wherein:
each $R^1$ is independently —H or $C_{1-6}$ alkyl,
$R^2$ is —H or $C_{1-12}$ alkyl,
wherein the $C_{1-12}$ alkyl is optionally substituted with one or more —OH, —C(O)OH, and —O—P(O)(OH)$_2$;

each $R^3$ is independently —O-$[R^5$-O-$]_m$-$R^6$-$[R^5$-O-$]_m$-, —O-$[R^5$-O-$]_n$-C(O)N($R^1$)-$R^7$-N($R^1$)C(O)—O-$[R^5$O-$]_n$-, or —O-$[R^5$-O-$]_n$-C(O)N($R^1$)-$R^7$-N($R^1$)C(O)—O-$R^7$-O—C(O)N($R^1$)-$R^7$-N($R^1$)C(O)-O-$[R^5$-O-$]_n$-;

$R^4$ is —(CH$_2$)$_o$-(CH=CH)$_p$-(CH$_2$)$_q$-C(O)-O$R^1$; each $R^5$ is independently a $C_{2-8}$ alkylene, wherein the $C_{2-8}$ alkylene is optionally substituted with $C_{1-4}$ alkyl, —OH, —OC(O)CH($R^1$)=CH$_2$, or —OC(O)-$R^8$;

$R^6$ is a bond, $C_{2-8}$ alkylene, -Cy-O-, —Ar$_1$-O—, or —Ar$_1$-$R^9$-Ar$_2$-O-; each $R^7$ is independently $C_{2-8}$ alkylene, -Cy-, —Ar$_1$—, or —Ar$_1$-$R^9$-Ar$_2$-, wherein the $C_{2-8}$ alkylene is optionally substituted with one or more $C_{1-4}$ alkyl and —OH;

$R^8$ is $C_{1-12}$ alkyl, wherein the $C_{1-12}$ alkyl is optionally substituted with one or more —OH, —C(O)OH, and —O—P(O)(OH)$_2$;

$R^9$ is a bond or $C_{1-6}$ alkylene optionally substituted with $C_{1-4}$ alkyl;

Cy is $C_{3-8}$ cycloalkylenyl optionally substituted with one or more $C_{1-4}$ alkyl;

Ar$_1$ is $C_{6-14}$ arylene;

Ar$_2$ is a bond or Ar$_1$;

each m is independently an integer from 0-12;

each n is independently an integer from 1-10; and o, p, and q are each independently an integer from 0-4.

In some embodiments, m+m is no greater than 12.

In some embodiments, n+n is no greater than 12.

In some embodiments, n+o+p is greater than 0.

In some embodiments, n+p is 0-6.

In some embodiments o is 0.

In some embodiments, o is 1.

In many embodiments, the integers defining m and n may be an approximation. For example, m+m=9 may describe the average number of units for a given molecular weight. Some components may include m+m=6, 7, 8, 9, 10, 11, or 12, but overall have an average of 9.

In some embodiments, the curable resin composition may include ethoxylated bisphenol A dimethacrylate (B is —EMA), represented by Formula II, wherein each $R^1$ is $C_1$ alkyl, $R^3$ is —O-$[R^5$-O-$]_m$-$R^6$-$[R^5$-O-$]_m$-, wherein each m is 1; each $R^5$ is $C_2$ alkylene; $R^6$ is —Ar$_1$-$R^9$-Ar$_2$-O—; and $R^9$ is $C_1$ alkylene substituted with two $C_1$ alkyl.

In some embodiments, the curable resin composition may include bisphenol A-glycidyl methacrylate (B is —GMA), represented by Formula II, wherein each $R^1$ is $C_1$ alkyl, $R^3$ is —O-$[R^5$-O-$]_m$-$R^6$-$[R^5$-O-$]_m$-, wherein each m is 1; each $R^5$ is $C_2$ alkylene substituted with —OH; $R^6$ is —Ar$_1$-$R^9$-Ar$_2$-O-; and $R^9$ is $C_1$ alkylene substituted with two $C_1$ alkyl.

In some embodiments, the curable resin composition may include methacrylated bisphenol A-glycidyl methacrylate (MA B is —GMA), represented by Formula II, wherein each $R^1$ is $C_1$ alkyl, $R^3$ is —O-$[R^5$-O-$]_m$-$R^6$-$[R^5$-O-$]_m$-, wherein each m is 1; each $R^5$ is $C_2$ alkylene substituted with —OC(O)CH($R^1$)=CH$_2$; $R^6$ is —Ar$_1$-$R^9$-Ar$_2$-O—; and $R^9$ is $C_1$ alkylene substituted with two $C_1$ alkyl.

In some embodiments, the curable resin composition may include dodecyl methacrylate (DDMA), represented by Formula I, wherein $R^1$ is $C_1$ alkyl, and $R^2$ is $C_{12}$ alkyl.

In some embodiments, the curable resin composition may include glycerol dimethacrylate (GDMA), represented by Formula II, wherein each $R^1$ is $C_1$ alkyl, $R^3$ is —O-$[R^5$-O-$]_m$-$R^6$-$[R^5$-O-$]_m$-, wherein m+m is 1; $R^5$ is $C_3$ alkylene substituted with —OH; and $R^6$ is a bond.

In some embodiments, the curable resin composition may include glycerol dimethacrylate succinate (GDMA succinate), wherein each $R^1$ is $C_1$ alkyl, $R^3$ is —O-$[R^5$-O-$]_m$-$R^6$-$[R^5$-O-$]_m$-, wherein m+m is 1; $R^5$ is C3 alkylene substituted with —OC(O)-$R^8$; $R^6$ is a bond; and $R^8$ $C_2$ alkylene substituted with —C(O)OH.

In some embodiments, the curable resin composition may include hydroxyethyl methacrylate (HEMA), represented by Formula I, wherein $R^1$ is $C_1$ alkyl, $R^2$ is $C_2$ alkyl substituted with —OH.

In some embodiments, the curable resin composition may include hydroxyethyl methacrylate succinate (HEMA succinate), represented by Formula III, wherein $R^1$ is $C_1$ alkyl; $R^3$—O-$[R^5$-O-$]_m$-$R^6$-$[R^5$-O-$]_m$-, wherein in m+m is 1; $R^4$-(CH$_2$)$_o$-(CH=CH)$_p$-(CH$_2$)$_q$-C(O)-O$R^1$ wherein $R^1$ is —H, o+q is 2, and p is 0; $R^5$ is $C_2$ alkylene; and $R^6$ is a bond.

In some embodiments, the curable resin composition may include hydroxyethyl methacrylate phosphonate (HEMA phosphate), represented by Formula I, wherein $R^1$ is $C_1$ alkyl; $R^2$ is $C_2$ alkyl substituted with —OP(O)(OH)$_2$.

In some embodiments, the curable resin composition may include 1,6-hexanediol dimethacrylate (HDMA), represented by Formula II, wherein each $R^1$ is $C_1$ alkyl, $R^3$ is —O-$[R^5$-O-$]_m$-$R^6$-$[R^5$-O-$]_m$-, $R^6$ is $C_6$ alkylene, and each m is 0.

In some embodiments, the curable resin composition may include 10-methacryloyloxydecyl dihydrogen phosphate (MDP), represented by Formula I, wherein $R^1$ is $C_1$ alkyl, $R^2$ is $C_{10}$ alkyl substituted with —OP(O)(OH)$_2$.

In some embodiments, the curable resin composition may include 6-methacryloyloxydecyl dihydrogen phosphate (MHP), represented by Formula I, wherein $R^1$ is $C_1$ alkyl, $R^2$ is $C_6$ alkyl substituted with —OP(O)(OH)$_2$.

In some embodiments, the curable resin composition may include poly(ethylene glycol) (400) dimethacrylate (PEG400DMA), represented by Formula II, wherein each $R^1$ is $C_1$ alkyl, $R^3$ is In some embodiments, the curable resin composition may include triethylene glycol dimethacrylate (TEGDMA), represented by Formula II, wherein each $R^1$ is $C_1$ alkyl; $R^3$ is —O-$[R^5$-O-$]_m$-$R^6$-$[R^5$-O-$]_m$-, wherein m+m is 3; each $R^5$ is $C_2$ alkylene; and $R^6$ is a bond.

In some embodiments, the curable resin composition may include urethane dimethacrylate (UDMA), represented by Formula II, wherein each $R^1$ is $C_1$ alkyl; $R^3$ is —O-$[R^5$-O-$]_n$-C(O)N($R^1$)-$R^7$-N($R^1$)C(O)-O-$[R^5$-O-$]_n$-, wherein each n is 1 and each $R^5$ is —H; each $R^5$ is $C_2$ alkylene; $R^7$ is $C_6$ alkylene substituted with three $C_1$ alkyl.

In some embodiments, the curable resin composition may include one or more of B is —GMA, TEGDMA, GDMA, GDMA succinate, and HEMA.

In some embodiments, the curable resin composition may include one or more of HEMA, B is —GMA, TEGDMA, GDMA, GDMA succinate, DDMA, PEG400DMA, UDMA, HDMA, and B is —EMA.

In some embodiments, one or more (meth)acrylate monomer may be in the form of a single unit monomer, e.g., a monomer described by Formulae I, II, III.

In other embodiments, one or more (meth)acrylate monomers may be in the form of a repeat unit monomer, i.e., a monomer having more than one (single) unit monomer. A repeat unit monomer is partially cured and may have 2-100 monomer units. In some embodiments, a repeat unit monomer includes one monomer type. In other embodiments, a repeat unit monomer may include more than one monomer type, i.e., more than one (meth)acrylate monomer described herein.

In other embodiments, the one or more (meth)acrylate monomer may be selected from the following formulae:

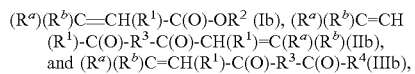

wherein:
each $R^a$ and each $R^b$ is independently —H, or $C_{1-6}$ alkyl,
each $R^1$ is independently —H, $C_{1-6}$ alkyl, halogen, or —CN,
$R^2$ is —H or $C_{1-12}$ alkyl,
wherein the $C_{1-12}$ alkyl is optionally substituted with one or more —OH, —C(O)OH, and —O-P(O)(OH)$_2$;
each $R^3$ is independently —O-[$R^5$-O-]$_m$-$R^6$-[$R^5$-O-]$_m$-, —O-[$R^5$-O-]$_n$-C(O)N($R^1$)-$R^7$-N($R^1$)C(O)—O-[$R^5$-O-]$_n$-, or —O-[$R^5$-O-]$_n$-C(O)N($R^1$)-$R^7$-N($R^1$)C(O)-O-$R^7$-O—C(O)N($R^1$)-$R^7$-N($R^1$)C(O)-[$R^5$-O-]$_n$-;
$R^4$ is —(CH$_2$)$_o$-(CH=CH)$_p$-(CH$_2$)$_q$-C(O)-O$R^1$; each $R^5$ is independently a $C_{2-8}$ alkylene, wherein the $C_{2-8}$ alkylene is optionally substituted with $C_{1-4}$ alkyl, —OH, —OC(O)CH($R^1$)=C($R^a$)($R^b$), or —OC(O)-$R^8$; $R^6$ is a bond, $C_{2-8}$ alkylene, -Cy-O-, —Ar$_1$-O—, or —Ar$_1$-$R^9$-Ar$_2$-O—;
each $R^7$ is independently $C_{2-8}$ alkylene, -Cy-, —Ar$_1$-, or —Ar$_1$-$R^9$-Ar$_2$-, wherein the $C_{2-8}$ alkylene is optionally substituted with one or more $C_{1-4}$ alkyl and —OH;
$R^8$ is $C_{1-12}$ alkyl, wherein the $C_{1-12}$ alkyl is optionally substituted with one or more —OH, —C(O)OH, and —O—(O)(OH)$_2$;
$R^9$ is a bond or $C_{1-6}$ alkylene optionally substituted with $C_{1-4}$ alkyl;
Cy is $C_{3-8}$ cycloalkylenyl optionally substituted with one or more $C_{1-4}$ alkyl;
Ar$_1$ is $C_{6-14}$ arylene;
Ar$_2$ is a bond or Ar$_1$;
each m is independently an integer from 0-12;
each n is independently an integer from 1-10; and
o, p, and q are each independently an integer from 0-4.

In some embodiments, the one or more (meth)acrylate monomer may include any combination of variables described herein for the one or more (meth)acrylate monomers of Formulae Ia-IIIa.

In some embodiments, the one or more (meth)acrylate monomer may include 2-chloroacrylic acid, 2-cyanoacrylic acid, or tiglic acid.

In some embodiments, the one or more acid-substituted (meth)acrylate monomer may be selected from the following formulae:

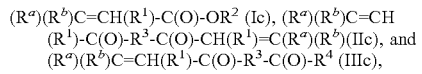

wherein:
each $R^a$ and each $R^b$ is independently —H, $C_{1-6}$ alkyl, and $C_{1-6}$ alkyl substituted with one or more —C(O)OH,
each $R^1$ is independently —H, $C_{1-6}$ alkyl, halogen, —CN, or $C_{1-6}$ alkyl substituted with one or more —C(O)OH,
wherein at least one of $R^1$, $R^a$, and $R^b$ is $C_{1-6}$ alkyl substituted with one or more —C(O)OH,
$R^2$ is —H or $C_{1-12}$ alkyl, wherein the $C_{1-12}$ alkyl is optionally substituted with one or more —OH, —C(O)OH, and —O—P(O)(OH)$_2$;
each $R^3$ is independently —O-[$R^5$-O-]$_m$-$R^6$-[$R^5$-O-]$_m$-, —O-[$R^5$-O-]$_n$-C(O)N($R^1$)-$R^7$-N($R^1$)C(O)-O-[$R^5$-O-]$_n$-, or —O-[$R^5$-O-]$_n$-C(O)N($R^1$)-$R^7$-N($R^1$)C(O)-O-$R^7$-O—C(O)N($R^1$)-$R^7$-N($R^1$)C(O)-O-[$R^5$-O-]$_n$-;
$R^4$ is —(CH$_2$)$_o$-(CH=CH)$_p$-(CH$_2$)$_q$-C(O)-O$R^1$; each $R^5$ is independently a $C_{2-8}$ alkylene, wherein the $C_{2-8}$ alkylene is optionally substituted with $C_{1-4}$ alkyl, —OH, —OC(O)CH($R^1$)=C($R^a$)($R^b$), or —OC(O)-$R^8$;
$R^6$ is a bond, $C_{2-8}$ alkylene, -Cy-O—, —Ar$_1$-O—, or —Ar$_1$-$R^9$-Ar$_2$-O—;
each $R^7$ is independently $C_{2-8}$ alkylene, -Cy-, —Ar$_1$-, or —Ar$_1$-$R^9$-Ar$_2$-, wherein the $C_{2-8}$ alkylene is optionally substituted with one or more $C_{1-4}$ alkyl and —OH;
$R^8$ is $C_{1-12}$ alkyl, wherein the $C_{1-12}$ alkyl is optionally substituted with one or more —OH, —C(O)OH, and —O—P(O)(OH)$_2$;
$R^9$ is a bond or $C_{1-6}$ alkylene optionally substituted with $C_{1-4}$ alkyl; Cy is $C_{3-8}$ cycloalkylenyl optionally substituted with one or more $C_{1-4}$ alkyl; Ar$_1$ is $C_{6-14}$ arylene; Ar$_2$ is a bond or Ar$_1$; each m is independently an integer from 0-12; each n is independently an integer from 1-10; and o, p, and q are each independently an integer from 0-4.

In some embodiments, the one or more acid-substituted (meth)acrylate monomer may include any combination of variables described herein for the one or more (meth)acrylate monomer of Formulae Ia-IIIa.

In some embodiments, the at least one acid-substituted (meth)acrylate monomer may be selected from aconitic acid, citraconic acid, fumaric acid, glytaconic acid, itaconic acid, maleic acid, and mesaconic acid.

In some embodiment, the curable resin composition includes an acrylic acid:itaconic acid copolymer.

In some embodiments, the curable resin composition includes an acrylic acid:maleic acid copolymer.

In some embodiments, the curable resin composition may include any combination of monomers in formulating the homopolymers and copolymers discloses in U.S. Pat. No. 4,209,434, which is incorporated by reference herein in its entirety.

In some embodiments, the curable resin composition may include any combination of monomers in formulating the homopolymers and copolymers found in currently available glass ionomer cements such as KETAC-FIL™ (3M), FUJI II™ and FUJI IX™ (GC Dental Industrial Corp.) and CHEMFIL™ Superior (Dentsply Sirona).

In some embodiments, the curable resin composition may include any combination of monomers in formulating homopolymers and copolymers such that the homopolymers and copolymers have an average molecular weight between about 5,000 and about 100,000, as evaluated against a polystyrene standard using gel permeation chromatography. Resin-modified glass ionomers and glass ionomers In some embodiments, the resin-modified glass ionomer or the glass ionomer may include a fluoroaluminosilicate reactive glass.

In some embodiments, the resin-modified glass ionomer or the glass ionomer may include any reactive glass disclosed in the following: Prosser et al., "Polyelectrolyte Cements", Wilson and Prosser, eds., Developments in Ionic Polymers-1, Chapter 5, Applied Science Publishers (London and New York, 1983), the disclosure of which is incorporated by reference herein in its entirety.

In some embodiments, the resin-modified glass ionomer or the glass ionomer may include any reactive glass, such as ion-leachable glasses, described in U.S. Pat. Nos. 3,655,605, 3,814,717, 4,143,018, 4,209,434, 4,360,605, 4,376,835, and 5,063,257, the disclosures of each of which are incorporated by reference herein in their entireties.

In some embodiments, the resin-modified glass ionomer or the glass ionomer may include any reactive glass, such as sol-gel derived glasses, described in U.S. Pat. No. 7,090,722, the disclosure of which is incorporated by reference herein in its entirety.

In some embodiments, the dental composition may include a reactive glass for use in a cement system selected from a leachable fluoride. The sustained release of fluoride ions as a byproduct of the setting reactions may provide cariostatic benefits. Examples of such reactive glass powders include fluoroaluminosilicate and fluoroaluminoborate ion-leachable glasses.

In some embodiments, the reactive glass may be in the form of particles that are finely divided effective to be conveniently be mixed with the other cement. In some embodiments, the reactive glass may have a particle diameter of about 0.05 to about 15 micrometers. For example, the reactive glass may have a particle diameter of about 0.1 to 10 micrometers. Particle diameter may be measured, for example, with a sedimentation analyzer or a laser diffraction analyzer.

In other embodiments, a FAS glass can optionally be subjected to a surface treatment. Suitable surface treatments may include an acid washing (e.g., treatment with a phosphoric acid), treatment with a phosphate, treatment with a chelating agent such as tartaric acid, or treatment with a silane or an acidic or basic silanol solution.

Suitable glasses will be familiar to those skilled in the art, and are available from a wide variety of commercial sources, and many are found in currently available glass ionomer cements such as VITREMER™, VITREBOND™, RELY X™, LUTING CEMENT and KETAC-FIL™. (3M), FUJI II™ and FUJI IX™. (GC Dental Industrial Corp.) and CHEMFIL™, Superior (Dentsply Sirona). Suitable acid-reactive fillers are also commercially available from e.g. Schott AG (Germany) or Speciality Glass (US).

In some embodiments, the resin-modified glass ionomer or the glass ionomer may be formulated as powder/liquid or paste/paste system.

In some embodiments, ionomers including acid-substituted (meth)acrylate monomers may fully harden in the dark due to the ionic reaction between the acidic units and cations leached from the glass. In fact, some commercially available RMGI products may cure on exposure to light from a dental curing lamp.

In some embodiments, resin-modified glass ionomers and glass ionomer may have calcium and phosphate ion release and recharge capabilities, re-mineralize enamel and/or dentine surfaces, and increase resistance of contacted tooth structures to acid attack. The release of ions (for example, at least one of calcium, fluoride and phosphorus) into the oral environment is known to enhance the natural re-mineralizing capability of dental structures, and the sustained release of calcium and phosphorous provided by GI/RMGI materials can be used to enhance mineralization at the surfaces of the teeth and reduce, prevent or repair white spot lesions (WSL) during a desired treatment time with a dental appliance, as well as improve the general oral health of the patient.

In some embodiments, the glass ionomer is Vitrebond Plus, as shown in the examples below.

Photoinitiators

In some embodiments, the photoinitiator may be a Norrish Type I photoinitiator. Norrish Type I photoinitiators are homolytically cleaved into two radical fragments upon irradiation with UV-light. These radicals then initiate polymerization of the monomer units. The photoinitiator used herein may be any Norrish Type I photoinitiator known to those skilled in the art.

Norrish Type II photoinitiators on the other hand require a hydrogen donor, e.g., amine synergist, in order for UV-irradiation to initiate radical formation. As shown below, Norrish Type I photoinitiators successfully cure the one or more (meth)acrylate monomers, whereas Norrish Type II photoinitiators do not.

In some embodiments, the photoinitiator is selected from a group under the trade name Irgacure® or Darocur®, e.g., Irgacure® 651, Irgacure® 819, Irgacure® 184, Irgacure® 2959, Darocurt 1173, or the like. These photoinitiators each have a benzoyl fragment that produces a benzyol radical upon irradiation with UV-light.

In some embodiments, the photoinitiator is 2,2-dimethoxy-2-phenylacetophenone.

In some embodiments, the photoinitiator is bis(2,4,6-trimethylbenzoyl)-phenylphosphineoxide.

In some embodiments, the photoinitiator is 1-hydroxycyclohexyl phenyl ketone.

In some embodiments, the photoinitiator is 2-hydroxy-4'-(2-hydroxyethoxy)-2-methylpropiophenone.

Methods of Repairing a Tooth Surface

In many embodiments, a method for repairing a tooth surface is described. The method may include providing a dental composition described herein. The method may further include contacting the dental composition to the tooth surface and applying a light at a wavelength from about 250 nm to about 700 nm to the dental composition on the tooth surface.

In some embodiments, the dental composition is contacted to the tooth surface as a one-part composition.

In other embodiments, the dental composition is contacted to the tooth surface as a two-part composition, e.g., a silver-fluoride composition and a curable resin composition.

In some embodiments, the applied light is at a wavelength in nm of about 250, 275, 300, 325, 350, 375, 400, 425, 450, 475, 500, 525, 550, 575, 600, 625, 650, 675, or 700, or a value within a range between any of the preceding values, for example, between about 350 nm and about 450 nm, between about 300 nm and about 400 nm, or the like.

In some embodiments, the light is applied for period of about 5 seconds to about 30 seconds.

In some embodiments, the light is applied for a period of about 20 seconds.

In many embodiments, the dental composition may include any dental composition described herein.

Kits

In many embodiments, a kit is described. The kit may include a dental composition described herein. The kit may further include a set of instructions directing a user to contact the dental composition to a tooth surface and apply light at a wavelength from about 250 nm to about 700 nm to the dental composition on the tooth surface.

In some embodiments, the dental composition is provided in a one-part.

In some embodiments, the dental composition is provided in a two-part, e.g., a silver-fluoride composition and a curable resin composition.

In some embodiments, the dental composition is provided as a two-part system to be used with a static-mixing unit.

In many embodiments, the instructions direct a user to carry out a method described herein.

In many embodiments, the dental composition may include any dental composition described herein.

EXAMPLES

Objects and advantages of this disclosure are further illustrated by the following examples, but the particular materials and amounts thereof recited in these examples, as well as other conditions and details, should not be construed to unduly limit this disclosure. These examples are merely for illustrative purposes only and are not meant to be limiting on the scope of the appended claims.

TABLE 1

Materials

| Description | Source | Location |
|---|---|---|
| Ammonium chloride (NH$_4$Cl) | VWR | West Chester, PA, USA |
| Ammonium iodide (NH$_4$I) | Honeywell Specialty Chemical | Seelze, Germany |
| Ammonium thiocyanate (NH$_4$SCN) | Alfa Aesar | Ward Hill, MA, USA |
| BisGMA (2,2-bis[4-(2-hydroxy-3-methacryloyloxypropoxy)phenyl]propane) | CAS Reg. No. 1565-94-2. | |
| BisGMA-TEGDMA70/30 | SpecialChem SA | Paris, France |
| CPQ (camphorquinone, CAS Reg. No. 10373-78-1) | Sigma Aldrich | St Louis, MO, USA |
| Disodium hydrogen citrate sesquihydrate | Alfa Aesar | Ward Hill, MA, USA |
| EDMAB (ethyl 4-(dimethylamino) benzoate) | Sigma Aldrich | St Louis, MO, USA |
| GDMA (glycerol dimethacrylate) | Sigma Aldrich | St Louis, MO, USA |
| GDMA succinate | Synthesized | |
| HEMA (2-hydroxyethyl methacrylate) | ESSTECH, Inc. | Essington, PA, USA |
| IRGACURE 819 (CAS 162881-26-7) | Sigma Aldrich | St Louis, MO, USA |
| Potassium phosphate monobasic | Sigma Aldrich | St Louis, MO, USA |
| PHOTAC FIL QUICK Light-Cured Glass Ionomer Restorative | 3M ESPE Company | St. Paul, MN, USA |
| Potassium sulfate | J. T. Baker | Phillipsburg, NJ, USA |
| Silver fluoride (AgF) | Oakwood Chemical | West Columbia, SC, USA |
| Silver iodide | Sigma Aldrich | St Louis, MO, USA |
| Silver diamine fluoride solution 38%, commercially available as ADVANTAGE ARREST silver diamine fluoride | Elevate Oral Care | West Palm Beach, FL, USA |
| Sodium carbonate | EMD | Gibbstown, NJ, USA |
| VITREBOND PLUS Light Cure Glass Ionomer Liner/Base (Liquid and Paste) | 3M ESPE Company | St. Paul, MN, USA |
| VBCP Copolymer | Made by reacting AA:ITA (acrylic acid:itaconic acid) copolymer with sufficient IEM (2-isocyanatoethyl methacrylate) to convert 16 mole percent of the acid groups of the copolymer to pendent methacrylate groups according to the dry polymer preparation of Example 11 of U.S. Pat. No. 5,130,347 | |

PREPARATORY EXAMPLE A

Preparatory Example A was prepared by the following procedure. Exact percent quantities are described in the tables below. NH4I and NH4F were dissolved in water first then AgI was added and mixed well to form a solution.

TABLE 2

Preparatory Example A

| Components | Percentage |
|---|---|
| AgI | 31.1 |
| NH$_4$I | 31.4 |
| NH$_4$F | 4.9 |
| Water | 32.7 |
| Total | 100 |

PREPARATORY EXAMPLE B

Preparatory Example B was a composition of photo curable resin prepared according to the percentages listed in Table 3.

TABLE 3

Preparatory Example B

| Components | Percentage |
|---|---|
| HEMA with 150 PPM MEHQ | 66.0 |
| BisGMA-TEGDMA70/30 | 19.8 |
| GDMA | 13.2 |
| CPQ | 0.4 |
| EDMAB | 0.7 |
| Total | 100 |

Examples and Comparative Examples Preparations

Amounts of Preparatory Example A and Preparatory Example B were combined to create the inventive Examples and Comparative Examples listed in the tables below, with the reported percent concentrations of each component and any additional components, such as photoinitiators, etc. The Comparative and inventive Example compositions were then exposed to a blue LED light using 3M ELIPAR DEEPCURE-S LED curing light, (available from 3M Company of St. Paul, MN, USA) with maximum wavelength 450 nm and output approximately 1500 mW/cm$^2$ for 20 seconds. Curing (hardening) of the compositions using this curing light was recorded as either Yes or No.

TABLE 4

COMPARATIVE EXAMPLES CE-1 and CE-2 and EXAMPLES Ex. 1 to Ex. 3

| Components | CE-1 | CE-2 | Ex. 1 | Ex. 2 | Ex. 3 |
|---|---|---|---|---|---|
| HEMA | 39.6 | 29.7 | 39.1 | 49.6 | 24.0 |
| BisGMA | 0.0 | 29.7 | 0.0 | 0.0 | 24.0 |
| BisGMA-TEDGMA (70/30) | 11.9 | 0.0 | 11.7 | 9.3 | 0.0 |
| GDMA | 7.9 | 0.0 | 7.8 | 9.6 | 0.0 |
| GDMA succinate | 0.0 | 0.0 | 0.0 | 0.0 | 0.0 |
| CPQ | 0.24 | 0.24 | 0.23 | 0.24 | 0.00 |
| EDMAB | 0.40 | 0.48 | 0.39 | 0.41 | 0.00 |
| Irgucure 819 | 0.00 | 0.00 | 0.78 | 0.62 | 0.48 |
| VBCP | 0.00 | 0.00 | 0.00 | 1.69 | 0.00 |
| Prep. Ex. A | 40.0 | 39.8 | 40.0 | 28.6 | 51.6 |
| SDF (Silver Diamine Fluoride) | 0.0 | 0.0 | 0.0 | 0.0 | 0.0 |
| total (wt %) | 100.0 | 100.0 | 100.0 | 100.0 | 100.0 |
| Cured by blue LED with 20 seconds? | No | No | Yes | Yes | Yes |

TABLE 5

EXAMPLES Ex. 4 to Ex. 8 and COMPARATIVE EXAMPLE CE-3

| Components | Ex. 4 | Ex. 5 | Ex. 6 | Ex. 7 | Ex. 8 | CE-3 |
|---|---|---|---|---|---|---|
| HEMA | 30.5 | 15.4 | 23.1 | 45.0 | 45.0 | 34.7 |
| BisGMA | 30.5 | 0.0 | 0.0 | 45.0 | 45.0 | 0.0 |
| BisGMA-TEDGMA (70/30) | 0.0 | 28.6 | 42.9 | 0.0 | 0.0 | 64.4 |
| GDMA | 0.0 | 0.0 | 0.0 | 0.0 | 0.0 | 0.0 |
| GDMA succinate | 0.0 | 22.0 | 0.0 | 0.0 | 0.0 | 0.0 |
| CPQ | 0.00 | 0.00 | 0.00 | 0.00 | 0.00 | 0.00 |
| EDMAB | 0.00 | 0.00 | 0.00 | 0.00 | 0.00 | 0.00 |
| Irgucure 819 | 0.61 | 0.66 | 0.67 | 0.90 | 0.90 | 1.00 |
| VBCP | 0.00 | 0.00 | 0.00 | 0.00 | 0.00 | 0.00 |
| Prep. Ex. A | 38.5 | 33.3 | 33.3 | 9.1 | 0.0 | 0.0 |
| SDF (Silver Diamine Fluoride) | 0.0 | 0.0 | 0.0 | 0.0 | 9.1 | 0.0 |
| total (wt %) | 100 | 100 | 100 | 100 | 100 | 100 |
| Cured by blue LED with 20 seconds? | Yes | Yes | Yes | Yes | Yes | Yes |

Fluoride Release Test

The fluoride release of various cured examples was measured to demonstrate the ability of the cured material to still release fluoride, a beneficial ion to tooth enamel health and restoration, despite being cured into a polymeric matrix. A Thermo Scientific ORION 4-STAR PLUS pH/ISE meter and fluoride electrode was used. Total Ionic Strength Adjustment Buffer II (TISAB) concentrate solution, available from Sigma Aldrich, was used with fluoride ion selective electrodes. The instrument was calibrated with 10 ppm fluoride with TISAB II, 20 ppm fluoride with TISAB, and 200 ppm fluoride with TISAB, from Sigma Aldrich. The fluoride ion concentration of the prepared examples in water was calculated against the fluoride standards calibration curve.

The pre-cured example compositions were filled into a disk-shaped TEFLON mold with dimensions of 20 mm diameter and 1 mm thick/deep. The sample was sandwiched between two PET films on top and bottom of the mold. The compositions were then light cured with the 3M ELIPAR DEEPCURE-S LED curing light for 20 seconds to cure/harden the example compositions. The weight in grams was recorded for each disk. The disk was soaked in 25 mL 37° C. deionized water for 24 hours. The fluoride ion release was measured with the fluoride ion measurement instrument. The fluoride release from the cured disk was calculated with ugF/g=(Concentration of F in ppm)×(sample volume in mL)/(disk weight in grams). The fluoride release from the cured disk was performed in triplicate for each tested sample.

TABLE 6

Fluoride Release Testing Results for Examples Ex. 7-Ex. 9, and CE-3

| Fluoride Release | Ex. 4 | Ex. 5 | Ex. 6 | CE-3 |
|---|---|---|---|---|
| µg/g | 4839 | 6620 | 6613 | 2 |
| Std. Dev. | 1013 | 956 | 1727 | 0 |

Example 9—Two Part Resin Modified Glass Ionomer Example

A chemical paste part A was prepared by mixing well 5% Preparatory Example A with 95% of the paste component of commercially available product VITREBOND PLUS Light Cure Glass Ionomer Liner/Base. A liquid part B was prepared by mixing well 1% of IRGACURE 819 with 99% of the liquid component of commercially available product VITREBOND PLUS Light Cure Glass Ionomer Liner/Base. Chemical paste A was mixed with liquid mixture B at a weight/weight ratio of 1.5:1 on a mixing pad for 10 seconds to from a RMGI coating including the silver fluoride amine complex of the present disclosure. The mixture of Example 9 was cured into a hardened coating by exposing it to the 3M ELIPAR DEEPCURE-S LED curing light for 60 seconds.

Example 10—Two Part Glass Ionomer Example

A chemical paste part A was prepared by mixing well 50% Preparatory Example A with 50% fluoroaluminosilicate (FAS) glass. A liquid part B was prepared by mixing well 50% water with 50% of 3M PHOTAC FIL QUICK Light-Cured Glass Ionomer Restorative; the latter being an acrylic acid/maleic acid copolymer. Chemical paste A was mixed with liquid mixture B at a weight/weight ratio of 1.5:1 on a mixing pad for 10 seconds to from a GI coating including the silver fluoride amine complex of the present disclosure. This final composition of Example 10 set hard (cured) in 2 minutes and 30 seconds when kept at a temperature of 37° C.

METHODS OF USING THE INVENTIVE COMPOSITIONS ON TOOTH SURFACES

The following examples illustrate embodiments of the use of the inventive composition on tooth surfaces. Bovine teeth samples were prepared in the following manner to serve as a test surface for Example treatments. Bovine teeth were held in an acrylic mold and polished with 120 grit sand paper to expose the dentin, then polished with 320 grit sandpaper to smooth the dentin surface.

Example 11

One drop of the composition of Example 7, above, was place on a prepared bovine dentin surface and then cured in place by exposing it to the 3M ELIPAR DEEPCURE-S LED curing light for 20 seconds. The original color of Example 7 composition before curing was pale yellow.

There was no color change after curing, the example remained a pale yellow color. EXAMPLE 11 demonstrates an aesthetic advantage over Example 12.

Example 12

One drop of the composition of Example 8, above, was place on a prepared bovine dentin surface and then cured in place by exposing it to the 3M ELIPAR DEEPCURE-S LED curing light for 20 seconds. The original color of Example 8 composition before curing was also a pale yellow. However, after curing, the example turned dark brown. This demonstrates that while silver diamine fluoride can be used as the source of fluoride in the curable matrix, the final condition is less aesthetically pleasing.

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

What is claimed is:

1. A dental composition comprising:
   a silver-fluoride composition comprising:
      a source of silver cations,
      a source of fluoride anions,
      a source of iodide or thiocyanate anions, and water; and
   a curable resin composition comprising:
      at least one (meth) acrylate monomer.

2. The dental composition of claim 1, wherein silver cations are present in an amount of 13-17 wt % with respect to the weight of the silver-fluoride composition.

3. The dental composition of claim 1, wherein the fluoride anions are present in an amount of 2.25-3.0 wt % with respect to the weight of the silver-fluoride composition.

4. The dental composition of claim 1, comprising:
   silver cations and iodide anions in a molar ratio of less than 0.42:1, and
   water present in an amount less than 41.2 wt % with respect to the weight of the dental composition.

5. The dental composition of claim 1, comprising:
   silver cations and thiocyanate anions in a molar ratio of less than 0.37:1, and
   water present in an amount less than 57.1 wt % with respect to the weight of the dental composition.

6. The dental composition of claim 1, wherein water is present in an amount less than of 45 wt % with respect to the weight of the silver-fluoride composition.

7. The dental composition of claim 1, wherein the source of silver cations is selected from silver fluoride, silver chloride, silver nitrate, silver iodide, silver diamine fluoride, and a combination thereof.

8. The dental composition of claim 1, wherein the source of fluoride anions is selected from silver fluoride, silver diamine fluoride, sodium fluoride, ammonium fluoride, potassium fluoride, an organic ammonium fluoride, and a combination thereof.

9. The dental composition of claim 1, wherein the source of iodide anions is selected from ammonium iodide, sodium iodide, potassium iodide, silver iodide, and a combination thereof, or the source of thiocyanate anions is selected from ammonium thiocyanate, sodium thiocyanate, guanidinium thiocyanate, potassium thiocyanate, silver thiocyanate, and a combination thereof.

10. The dental composition of claim 1, the silver-fluoride composition comprising silver iodide, ammonium iodide, and ammonium fluoride.

11. The dental composition of claim 1, further comprising a photoinitiator.

12. The dental composition of claim 11, wherein the photoinitiator is bis(2,4,6-trimethylbenzoyl)-phenylphosphineoxide.

13. The dental composition of claim 1, the at least one (meth) acrylate selected from the formulae:

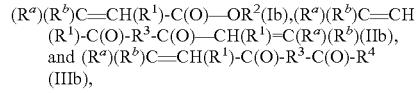

$(R^a)(R^b)C{=}CH(R^1)\text{-}C(O){-}OR^2$ (Ib), $(R^a)(R^b)C{=}CH(R^1)\text{-}C(O){-}R^3\text{-}C(O){-}CH(R^1){=}C(R^a)(R^b)$ (IIb),
and $(R^a)(R^b)C{=}CH(R^1)\text{-}C(O)\text{-}R^3\text{-}C(O)\text{-}R^4$ (IIIb), wherein:
each $R^a$ and each $R^b$ is independently —H, or $C_{1-6}$ alkyl,
each $R^1$ is independently —H, $C_{1-6}$ alkyl, halogen, or —CN,
$R^2$ is —H or $C_{1-12}$ alkyl,
   wherein the $C_{1-12}$ alkyl is optionally substituted with one or more —OH, —C(O)OH, and —O—P(O)(OH)$_2$;
each $R^3$ is independently-O-[$R^5$-O-]$_m$-$R^6$-[$R^5$-O-]$_m$—, —O-[$R^5$—O-]$_n$—C(O)N($R^1$)-$R^7$—N($R^1$) C(O)—O-[$R^5$—O-]$_n$—, or —O-[$R^5$—O-]$_n$—C(O)N($R^1$)-$R^7$-N($R^1$) C(O)—O-$R^7$—O—C(O)N($R^1$)-$R^7$—N($R^1$) C(O)—O-[$R^5$—O-]$_n$—;
$R^4$ is —(CH$_2$)$_n$—(CH=CH)$_p$—(CH$_2$)$_q$—C(O)—O$R^1$;
each $R^5$ is independently a $C_{2-8}$ alkylene,
   wherein the $C_{2-8}$ alkylene is optionally substituted with $C_{1-4}$ alkyl, —OH, —OC(O)CH($R^1$)=C($R^a$)($R^b$), or —OC(O)-$R^8$;
$R^6$ is a bond, $C_{2-8}$ alkylene, —Cy-O—, —Ar-O—, or —Ar-$R^9$-Ar$_2$—O—;
each $R^7$ is independently $C_{2-8}$ alkylene, —Cy-, —Ar$_1$—, or —Ar$_1$-$R^9$-Ar$_2$—,
   wherein the $C_{2-8}$ alkylene is optionally substituted with one or more $C_{1-4}$ alkyl and —OH;
$R^8$ is $C_{1-12}$ alkyl, wherein the $C_{1-12}$ alkyl is optionally substituted with one or more —OH, —C(O)OH, and —O—P(O)(OH)$_2$;
$R^9$ is a bond or $C_{1-6}$ alkylene optionally substituted with $C_{1-4}$ alkyl;
Cy is $C_{3-8}$ cycloalkylenyl optionally substituted with one or more $C_{1-4}$ alkyl;
Ar$_1$ is $C_{6-14}$ arylene;
Ar$_2$ is a bond or Ar$_1$;

each m is independently an integer from 0-12;
each n is independently an integer from 1-10; and
o, p, and q are each independently an integer from 0-4.

14. The dental composition of claim 1, the at least one (meth) acrylate selected from the formulae:

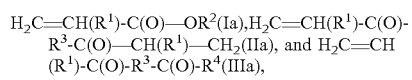

wherein:
each $R^1$ is independently -H or $C_{1-6}$ alkyl,
$R^2$ is —H or $C_{1-12}$ alkyl,
  wherein the $C_{1-12}$ alkyl is optionally substituted with one or more -OH, —C(O)OH, and —O—P(O)(OH)$_2$;
each $R^3$ is independently-O—[$R^5$—O—]$_m$-$R^6$-[$R^5$—O—]$_m$—, —O—[$R^5$—O—]$_n$—C(O)N($R^1$)-$R^7$—N($R^1$) C(O)—O—[$R^5$—O—]$_n$—, or —O—[$R^5$—O—]$_n$—C(O)N($R^1$)-$R^7$-N($R^1$) C(O)—O-$R^7$—O—C(O)N($R^1$)-$R^7$—N($R^1$) C(O)—O—[$R^5$—O—],—;
$R^4$ is —(CH$_2$)$_n$—(CH=CH)$_p$—(CH$_2$)$_q$—C(O)—O$R^1$;
each $R^5$ is independently a $C_{2-8}$ alkylene,
  wherein the $C_{2-8}$ alkylene is optionally substituted with $C_{1-4}$ alkyl, —OH, —OC(O)CH($R^1$)=CH$_2$, or —OC(O)-$R^8$;
$R^6$ is a bond, $C_{2-8}$ alkylene, —Cy-O—, —Ar$_1$—O—, or —Ar$_1$-$R^9$-Ar$_2$—O—;
each $R^7$ is independently $C_{2-8}$ alkylene, —Cy-, —Ar$_1$—, or —Ar$_1$-$R^9$-Ar$_2$—,
  wherein the $C_{2-8}$ alkylene is optionally substituted with one or more $C_{1-4}$ alkyl and —OH;
$R^8$ is $C_{1-12}$ alkyl, wherein the $C_{1-12}$ alkyl is optionally substituted with one or more —OH, —C(O)OH, and —O—P(O)(OH)$_2$;
$R^9$ is a bond or $C_{1-6}$ alkylene optionally substituted with $C_{1-4}$ alkyl,
Cy is $C_{3-8}$ cycloalkylene optionally substituted with one or more $C_{1-4}$ alkyl;
Ar$_1$ is $C_{6-14}$ arylene;
Ar$_2$ is a bond or Ar$_1$;
each m is independently an integer from 0-12;
each n is independently an integer from 1-10; and
o, p, and q are each independently an integer from 0-4.

15. The dental composition of claim 1, the one or more (meth) acrylate monomer is selected from HEMA, Bis—GMA, TEGDMA, GDMA, GDMA succinate, DDMA, PEG400DMA, UDMA, HDMA, and Bis —EMA.

16. The dental composition of claim 1, further comprising a resin-modified glass ionomer or a glass ionomer.

17. The dental composition of claim 1, further comprising at least one acid-modified (meth) acrylate monomer.

18. The dental composition of claim 17, wherein the at least one acid-modified (meth) acrylate monomer is selected from:

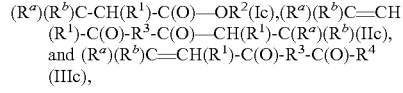

wherein:
each $R^a$ and each $R^b$ is independently —H, $C_{1-6}$ alkyl, and $C_{1-6}$ alkyl substituted with one or more —C(O)OH,
each $R^1$ is independently —H, $C_{1-6}$ alkyl, halogen, —CN, or $C_{1-6}$ alkyl substituted with one or more —C(O)OH,
  wherein at least one of $R^1$, $R^a$, and $R^b$ is $C_{1-6}$ alkyl substituted with one or more —C(O)OH,
$R^2$ is —H or $C_{1-12}$ alkyl,
  wherein the $C_{1-12}$ alkyl is optionally substituted with one or more-OH, —C(O)OH, and —O—P(O)(OH)$_2$;
each $R^3$ is independently-O—[$R^5$—O—]$_m$-$R^6$-[$R^5$—O—]$_m$—, —O—[$R^5$—O—]$_n$—C(O)N($R^1$)-$R^7$, N($R^1$) C(O)—O—[$R^5$—O—]$_n$—, or —O—[$R^5$—O—]$_n$—C(O)N($R^1$)-$R^7$-N($R^1$) C(O)—O-$R^7$—O—C(O)N($R^1$)-$R^7$—N($R^1$) C(O)—O—[$R^5$—O—]$_n$—;
$R^4$ is —(CH$_2$)$_n$—(CH=CH)$_p$—(CH$_2$)$_q$—C(O)—O$R^1$;
each $R^5$ is independently a $C_{2-8}$ alkylene,
  wherein the $C_{2-8}$ alkylene is optionally substituted with $C_{1-4}$ alkyl, —OH, —OC(O)CH($R^1$)-C($R^a$)($R^b$), or —OC(O)-$R^8$;
$R^6$ is a bond, $C_{2-8}$ alkylene, —Cy-O—, —Ar$_1$—O—, or —Ar$_1$-$R^9$-Ar$_2$—O—;
each $R^7$ is independently $C_{2-8}$ alkylene, —Cy-, —Ar$_1$—, or —Ar$_1$-$R^9$-Ar$_2$—,
  wherein the $C_{2-8}$ alkylene is optionally substituted with one or more $C_{1-4}$ alkyl and —OH;
$R^8$ is $C_{1-12}$ alkyl, wherein the $C_{1-12}$ alkyl is optionally substituted with one or more —OH, —C(O)OH, and —O—P(O)(OH)$_2$;
$R^9$ is a bond or $C_{1-6}$ alkylene optionally substituted with $C_{1-4}$ alkyl;
Cy is $C_{3-8}$ cycloalkylenyl optionally substituted with one or more $C_{1-4}$ alkyl;
Ar$_1$ is $C_{6-14}$ arylene;
Ar$_2$ is a bond or Ar$_1$;
each m is independently an integer from 0-12;
each n is independently an integer from 1-10; and
o, p, and q are each independently an integer from 0-4.

19. A kit comprising:
a dental composition of claim 1; and
a set of instructions directing a user to:
  contact the dental composition to a tooth surface, and apply light at a wavelength from about 250 nm to about 700 nm to the dental composition on the tooth surface.

20. A method of repairing a tooth surface, the method comprising:
providing a dental composition of claim 1;
contacting the dental composition to the tooth surface; and
applying light at a wavelength from about 250 nm to about 700 nm to the dental composition on the tooth surface.

* * * * *